United States Patent [19]

Laumeyer

[11] Patent Number: 5,710,577
[45] Date of Patent: Jan. 20, 1998

[54] PIXEL DESCRIPTION PACKET FOR A RENDERING DEVICE

[75] Inventor: Robert A. Laumeyer, Minneapolis, Minn.

[73] Assignee: Lasermaster Corporation, Eden Prairie, Minn.

[21] Appl. No.: 414,577

[22] Filed: Mar. 31, 1995

Related U.S. Application Data

[63] Continuation-in-part of Ser. No. 319,491, Oct. 7, 1994, Pat. No. 5,572,632.

[51] Int. Cl.[6] .................................................. G09G 5/36
[52] U.S. Cl. ........................ 345/189; 345/203; 345/199
[58] Field of Search .................................... 345/150, 152, 345/153, 185, 186, 189, 199, 203, 154, 155, 132; 358/518

[56] References Cited

U.S. PATENT DOCUMENTS

| | | | |
|---|---|---|---|
| 4,500,915 | 2/1985 | Schreiber | 358/78 |
| 4,670,780 | 6/1987 | McManus et al. | 358/80 |
| 4,731,662 | 3/1988 | Udagawa et al. | 358/75 |
| 4,843,379 | 6/1989 | Stansfield | 340/701 |
| 4,941,038 | 7/1990 | Walowit | 358/80 |
| 5,185,661 | 2/1993 | Ng | 358/75 |
| 5,243,414 | 9/1993 | Dalrymple et al. | 358/500 |
| 5,257,097 | 10/1993 | Pineau et al. | 358/500 |
| 5,268,754 | 12/1993 | Van de Capelle et al. | 358/527 |
| 5,278,678 | 1/1994 | Harrington | 358/518 |
| 5,282,046 | 1/1994 | Yamaguchi | 358/296 |
| 5,296,923 | 3/1994 | Hung | 358/527 |
| 5,299,291 | 3/1994 | Ruetz | 395/109 |
| 5,305,119 | 4/1994 | Rolleston et al. | 358/500 |
| 5,309,257 | 5/1994 | Bonino et al. | 358/504 |
| 5,313,291 | 5/1994 | Appel et al. | 358/501 |
| 5,315,415 | 5/1994 | Kawai et al. | 358/515 |
| 5,319,473 | 6/1994 | Harrington | 358/501 |
| 5,321,797 | 6/1994 | Morton | 395/131 |
| 5,323,249 | 6/1994 | Liang | 358/518 |
| 5,331,440 | 7/1994 | Kita et al. | 358/529 |
| 5,502,462 | 3/1996 | Mical et al. | 345/185 |
| 5,517,334 | 5/1996 | Morag et al. | 358/518 |

OTHER PUBLICATIONS

"Color Encoding Standard", *Xerox System Integration Standard*, Jul. 1991.

*Primary Examiner*—Andrew Faile
*Assistant Examiner*—Andrew B. Christensen
*Attorney, Agent, or Firm*—Kinney & Lange; Paul H. McDowall

[57] ABSTRACT

Output device command information and color description information are identified in a source image description and encoded into a pixel description packet. The source image description is converted into an arrangement of pixel data with each pixel location in the arrangement having a pixel description packet associated therewith. The pixel description packet is then decoded to determine output device command information and color information which is provided to an output device on a pixel-by-pixel basis for forming output pixels representative of source images.

10 Claims, 2 Drawing Sheets

PIXEL DESCRIPTION PACKET FOR A RENDERING DEVICE

CROSS-REFERENCES TO RELATED APPLICATION

This application is a continuation-in-part of an application entitled "UNIVERSAL FRAME BUFFER FOR A RENDERING DEVICE", Ser. No. 08/319,491, filed Oct. 7, 1994 now U.S. Pat. No. 5,572,632.

BACKGROUND OF THE INVENTION

The present invention relates to a method and apparatus for rendering an arrangement of pixel data representative of source images from source image descriptions. More particularly, the present invention relates to the assignment of a pixel description packet to pixel locations based on the source image description to provide control of an output device on a pixel-by-pixel basis.

A wide variety of image generation systems utilize conventional page description languages to represent text and graphical images. Page description languages generally require less memory to describe text and graphic images than if the image were described as a full page pixel array. Because image descriptions using page description languages are very concise many application programs for generating text and graphic images utilize conventional page description languages to describe these images. One such conventional page description language is the PostScript® page description language available from Adobe Systems Inc.

Output devices for displaying text and graphic images frequently represent these images by forming a series of picture elements commonly referred to as "pixels". The output device often fores these images in a line-by-line sequence of pixel rows. Individual pixels in these output images are formed in a variety of ways, such as, the application of colorants such as inks or toners or the excitation of colored phosphors in the case of video displays, just to name a few.

Before an image generated by a page description based image generator can be displayed or printed by a pixel based output device, the page description must be converted to a format suitable for the output device. This conversion process is frequently performed by a Raster Image Processor (RIP) which renders the page description of an image as an arrangement of pixel information which is used by the output device to form the output image. The raster image processor frequently stores this pixel data in a memory which is usually referred to as a "frame buffer". The frame buffer contains pixel position information as well as color information associated with each pixel. This color information is usually specified in the page description language as color space coordinates in a color coordinate system such as CMYK or RGB color coordinate systems. These color space coordinates must then be translated to a particular CMYK values or RGB values, which are utilized by the selected output device to form an output image. These color values are determined from either a standard mathematical transformation or a look-up table.

There is an ever present need to provide output images that more accurately and precisely represent the image description provided by the image generator. Specialized colors or custom color descriptions, such as TRUMATCH® colors that are formed by predetermined percentages of each of the CMYK colorants and Pantone® colors which are formed by inks other than combinations of CMYK colorants, are often converted to an approximate color using a look-up table or by mapping through a color space. This approximation results in a loss of color fidelity between an image formed by the output device and the image description provided by the image generation device. The output device should be capable of providing high color fidelity and therefore any loss of color fidelity that occurs through the rendering process should be minimized or eliminated. In addition, the rendering process should be capable of providing good color fidelity without requiring large amounts of memory resources, which tend to increase the cost as well as increase the processing time of the rendering process.

SUMMARY OF THE INVENTION

The present invention is an apparatus and method for rendering an arrangement of pixel data representative of source images from source image descriptions. The apparatus of the present invention includes means for identifying output device command information and color description information in the source image description. This output device command information and color description information is encoded into a pixel description packet. Also included is a means for converting source image descriptions into an arrangement of pixel data, with each pixel location in the arrangement having a pixel description packet associated therewith. Means for decoding the pixel description packet determines output device command information and color description information for providing output device control on a pixel-by-pixel basis for forming output pixels representative of source images.

In one preferred embodiment the output device command information includes custom color specification and printer control command information. In this preferred embodiment color description information is encoded into the pixel description packet as color coordinates in a color coordinate system. Custom color specifications and output device command information are encoded into unused color coordinate values in the pixel description packet.

Another aspect of the present invention is a rendering system for a rendering source image descriptions as an arrangement of pixel data. The rendering system includes means for receiving image description commands and converting these commands into an arrangement of pixel locations with each pixel location having color values associated therewith. These color values are specified in a device independent color system. Also included is a storage device for storing color values associated with each pixel location. A video display means is connected to the storage device for displaying an image representative of the source image. Connection means connected to the storage device provides pixel location and pixel color information to output devices.

DETAILED DESCRIPTION OF THE PREFERRED EMBODIMENTS

Figure 1:
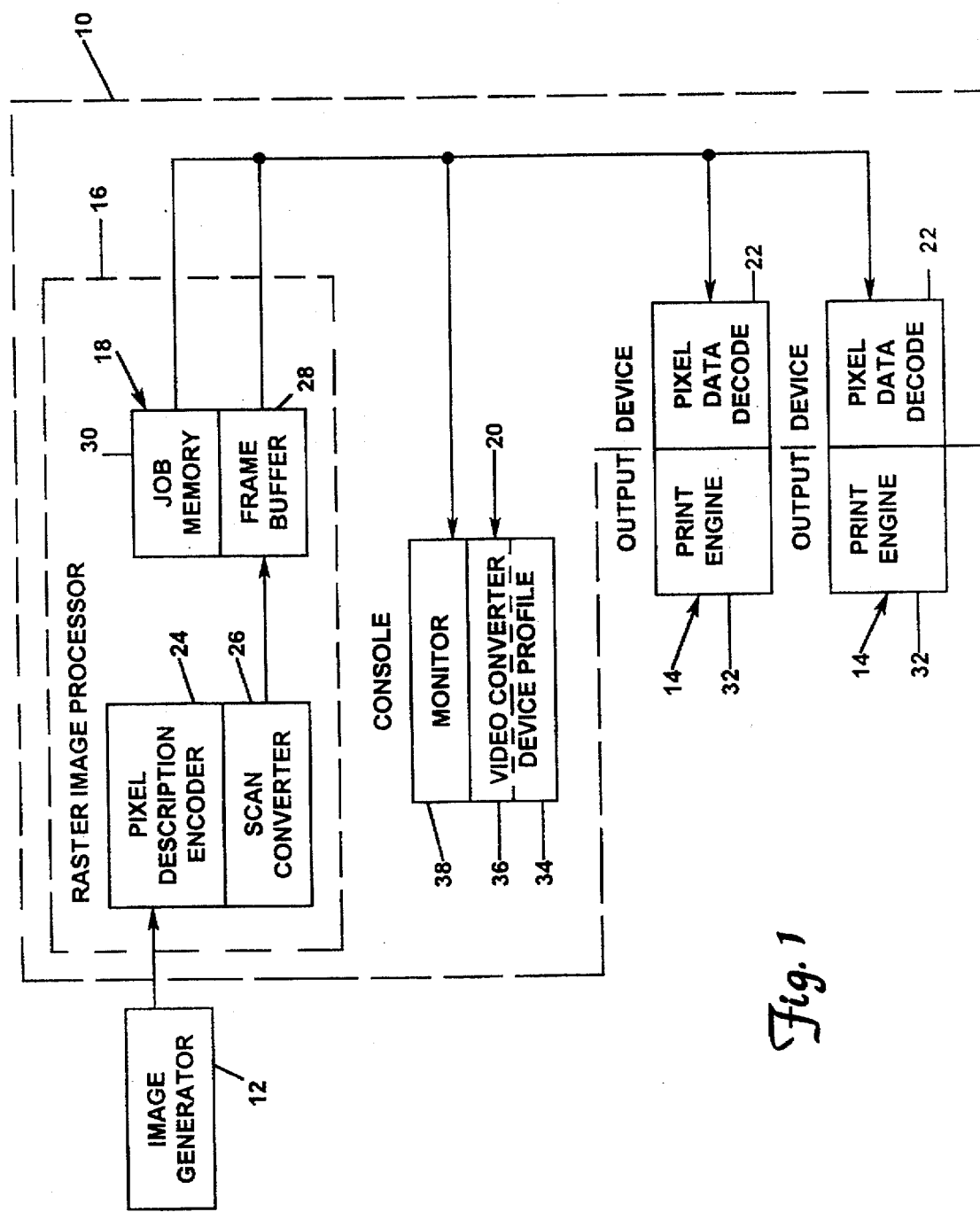
FIG. 1 is a block diagram of a system embodying the present invention.

Before describing the present invention it will be helpful to describe in more detail the process of assigning color values to pixel locations within a frame buffer performed by prior art raster image processors. An image generator provides a description of the source image which includes color information. This color information is usually in terms of color coordinate values for the color coordinate system selected by the image generator operator. For example, the PostScript® page description language supports the RGB, CMYK, and CIE based color coordinate systems. The color coordinate values for the given color system must be converted into color proportions for the particular colorants for the output device to apply colorants to form an image. Conversion of color coordinate values to amounts or proportions of colorants is performed using conventional techniques such as color transformations or look-up table methods. For the purposes of this application, standard colors are all colors that are specified in the image description using a selected color coordinate system or color space model.

Non-standard or custom colors are defined as being any color specified by the image generator that are not specified in terms of color coordinates in one of the selected color coordinate systems. Custom colors are those colors specified by the image generator which are not processed using the color combination process required by the color coordinate system mapping. For example, an operator may wish to specify that only magenta colorant is to be used for a selected portion of the source image. Therefore, under these circumstances magenta is a custom color. In contrast to specifying a custom color, when specifying magenta coloration utilizing the color combination process whereby values in a given color coordinate system are specified, it is likely that some combination of colors will be specified in order to provide an approximation of the magenta coloring. Another type of custom color is the specification of a predetermined combination of colorants such as provided for in the TRUMATCH® color swatch system. Yet another example of a custom color is the specification of a preformulated colorant such as a Pantone® color. The operator can specify preformulated colors for selected portions of the source image. These preformulated colors are then utilized by the output device so that the output image more precisely matches the specified colors in the source image. The previous examples are just a few examples of custom colors, however, any conventional technique for specifying output colors other than the specification of color coordinates in a selected color coordinate system can also be used to specify custom colors.

The present invention is a method and apparatus which, among other things, identifies these custom colors in the source image description and encodes these colors in a pixel description packet which is then stored in the frame buffer during the rendering process. The pixel description packets are then decoded and provided to the output device thereby providing color control to the output device on a pixel-by-pixel basis so that the output image has good color fidelity and more closely matches the color of the source image.

FIG. 1 shows a preferred embodiment of a rendering system 10 of the present invention for assigning a pixel description packet based on the source image description provided by an image generator 12 to provide control to an output device 14.

The image generator 12 provides an image description to the rendering system 10 of the present invention. The image generator 12 can be any one of a number of conventional devices such as a computer or processor capable of providing an image description. In one embodiment, the image generator 12 is a host computer running an applications program that generates an image description. The image description can be in a form of a variety of conventional descriptions such as the PostScript® page description language by Adobe Systems, Inc. or the Interpress® standard by Interleave, Inc., to name a few. This page description represents textual and graphical elements of the image together with their associated color description. This page description can also include job parameter information such as job file name, the output image resolution, the output image size, just to name a few. The job parameter information will, in general, be dependent upon the requirements of the output device 14 as well as the parameters that are supported by the application running on the image generator 12. The image description provided by the image generator 12 to the rendering system 10 contains all the information necessary for rendering the image description on the output device 14.

The rendering system 10 of the present invention includes a raster image processor 16, console 20 and pixel data decode device 22. The raster image processor 16 receives the image description from the image generator 12 and renders this image as an arrangement of pixel data that is stored in memory 18. The image data rendered in memory 18 includes a pixel description packet associated with each pixel. The rendered data is then provided from memory 18 to the output device 14. The pixel data decode device 22 decodes the pixel description packet for each pixel to determine color information as well as any special output device commands which are provided to the output device 14. The output device 14 utilizes this color information as well as any special output device commands to form the output image.

The raster image processor 16 further includes a pixel description encoder 24 and scan converter 26. The pixel description encoder identifies output device command information and color description information in the source image description provided by the image generator 12. Both the output device command information and color information are then encoded into a pixel description packet. The pixel description packet is then assigned a pixel location specified by the scan converter 26.

The scan converter 26 receives the image description from the image generator 12 and determines which pixel locations to assign the pixel description packet encoded by the pixel description encoder. The scan converter 26 preferably utilizes contextual information in assigning pixel description packets. For instance, once a color description is identified by the pixel description encoder 24, the scan converter 26 will assign every pixel location the same pixel description packet until a new color description or special output device command information is received by the pixel description encoder 24 whereupon a new pixel description packet will be encoded. As pixel locations are assigned a pixel description packet, they are stored in a frame buffer 28 within memory 18. This process is continued until the source image description is rendered in a frame buffer 28 as an arrangement of pixel locations with each pixel location having a pixel description packet associated therewith.

Job commands that are encountered in the image description are parsed and provided to the job memory 30. Memory 18 is preferably semi-conductor memory, however, any conventional memory that meets the raster image processor 16 requirements is also suitable. The raster image processor 16 is a conventional digital data processing device. In one preferred embodiment, the raster image processor 16 is a microprocessor.

In the preferred embodiment, the pixel description encoder 24 converts color description information received from the image generator 12 to CIELAB color space coordinate data using conventional transformation methods.

Because this CIELAB color coordinate data is output independent, the arrangement of pixel data stored in the frame buffer 28 can be provided to a variety of different output devices 14 as discussed in more detail in application Ser. No. 08/319,491 which is incorporated herein by reference.

In this preferred embodiment, the encoding of the pixel description packet will now be described in more detail. However, as background, it is necessary to briefly discuss the format of the CIELAB color space coordinate data. The CIELAB color space has two chromatic coordinates (A and B) and one luminance coordinate (L). Each of these three coordinates are represented by an eight bit value or 24 bits of data to represent a point in the CIELAB color space. The A and B chromatic coordinates are rounded off to the nearest whole number and represent a range of values from −128 to +127. The luminance coordinate is specified using a smaller range of values from 0 to 100. Because of human sensitivity to changes in luminance, the least significant bit is used to indicate a half unit fractional value for the luminance coordinate, thereby doubling the number of luminance values provided to 200.

The pixel description packet encoding provided by the pixel description encoder 24 will now be discussed for the preferred embodiment, wherein a CIELAB color space model is used to specify these standard colors. If an output device command is received from the image generator such as 300 dot per inch (dpi) resolution mode, or a three pass scan mode or if a custom color description is encountered, a unique pixel description packet is provided for each of these conditions as well as each of these custom colors. These custom colors as well as output device commands are encoded by selecting unused luminance values thereby identifying that the pixel description packet should be decoded as something other than the CIELAB color coordinate value. For example, as discussed earlier, an eight bit binary value is used to represent the luminance coordinate values between 0 and 200 for the CIELAB color coordinate system. The pixel description encoder 24 then assigns the unused luminance values 201–255 custom color and special output device commands such as 201 represents a non-process black, 202 represents only yellow coloration, 203 represents only red coloration and 204 represents that the output device should form a line of pixel colors using three passes. The pixel data decode device 22 is configured to provide corresponding output device control commands for each of these custom colors and output device control commands encoded in luminance coordinate values between 201 and 255.

If there are more than 54 custom colors and special output device control commands, then these additional output device commands as well as custom colors can be encoded by encoding these values in each of the eight bit A and B chromatic coordinates which can be decoded by the pixel data decode device 22 if an unused luminance value is set by the pixel description encoder 24. The encoding and decoding of custom color and output device control information into the color coordinate values can be accomplished in a wide variety of ways other than those described by examples. Any conventional encoding and decoding techniques can be used to encode custom color and output device control information into either unused coordinate values.

Printer control command information such as custom color information can be provided in the page description in a variety of ways depending on the page description language. For example, PostScript® provides a comment description that allows the application program or operator to specify a custom commands. The pixel description encoder 24 parses the image description provided by the image generator 12 to identify these printer control commands such as custom color specifications. For example, a PostScript® image description provided by the image generator 12 to the pixel description encoder 24 is checked for comments wherein a custom color may be specified. If a custom color is identified, a corresponding pixel description packet is assigned so that one or more pixels in which the scan converter 26 assigns this pixel description packet will have this custom color assigned thereto.

The output device 14 includes pixel data decode device 22 and print engine 32. The output device 14 receives the arrangement of pixel data from frame buffer 28 as well as job data from job memory 30 and utilizes this information to construct an output image.

The pixel data decode 22 receives a pixel description packet associated with each pixel in the output image. This pixel description packet may contain standard color information specified using a conventional color space and this packet may contain output device command information. If output device command information is present, this command information must be decoded to determine if a custom color is specified, if specific printer commands are specified, or both. In the preferred embodiment, wherein a CIELAB color space model is used to specify standard colors within the frame buffer 28, the pixel data decode 22 utilizes a color table to convert LAB color space values in the pixel description packet to color value data that is used by print engine 32 to produce the correct pixel color in the output image. If output device command information is present in the pixel description packet, this command information is decoded and provided to the print engine 32 to perform actions to produce the output image. This command information may include custom color information as well as operating mode information such as selection of a particular resolution.

The console 20 includes a device profile 34 and a video converter 36. The console allows an operator to alter frame buffer 28 or the job memory 30 so that the pixel image data stored in the frame buffer 28 can be selectively provided to one or more output devices 14. In addition, the console allows an operator to specify or alter job control information stored in job memory 30 such as selecting media type, output resolution, output image size, just to name a few.

The console 20 allows an operator to view the arrangement of pixel information and frame buffer 28 on monitor 38. In this preferred embodiment, the pixel description packet contains standard color information in a CIELAB color coordinate value. Because the CIELAB color space is device independent, the CIELAB color coordinate values can readily be converted into RGB color values using conventional techniques in device profile 34.

Prior art digital imaging systems do not store device independent color information in the frame buffer 28. Therefore a monitor based on an RGB color system and an output device based on a CMYK color system cannot accurately display the contents of the frame buffer 28.

The rendering system 10 shown in FIG. 1 can be configured in a variety of different ways. For example, the pixel data decode device 22 can be contained within the raster image processor 40. Although in general, the pixel data decode device will be different for each type of print engine 32.

Figure 2:
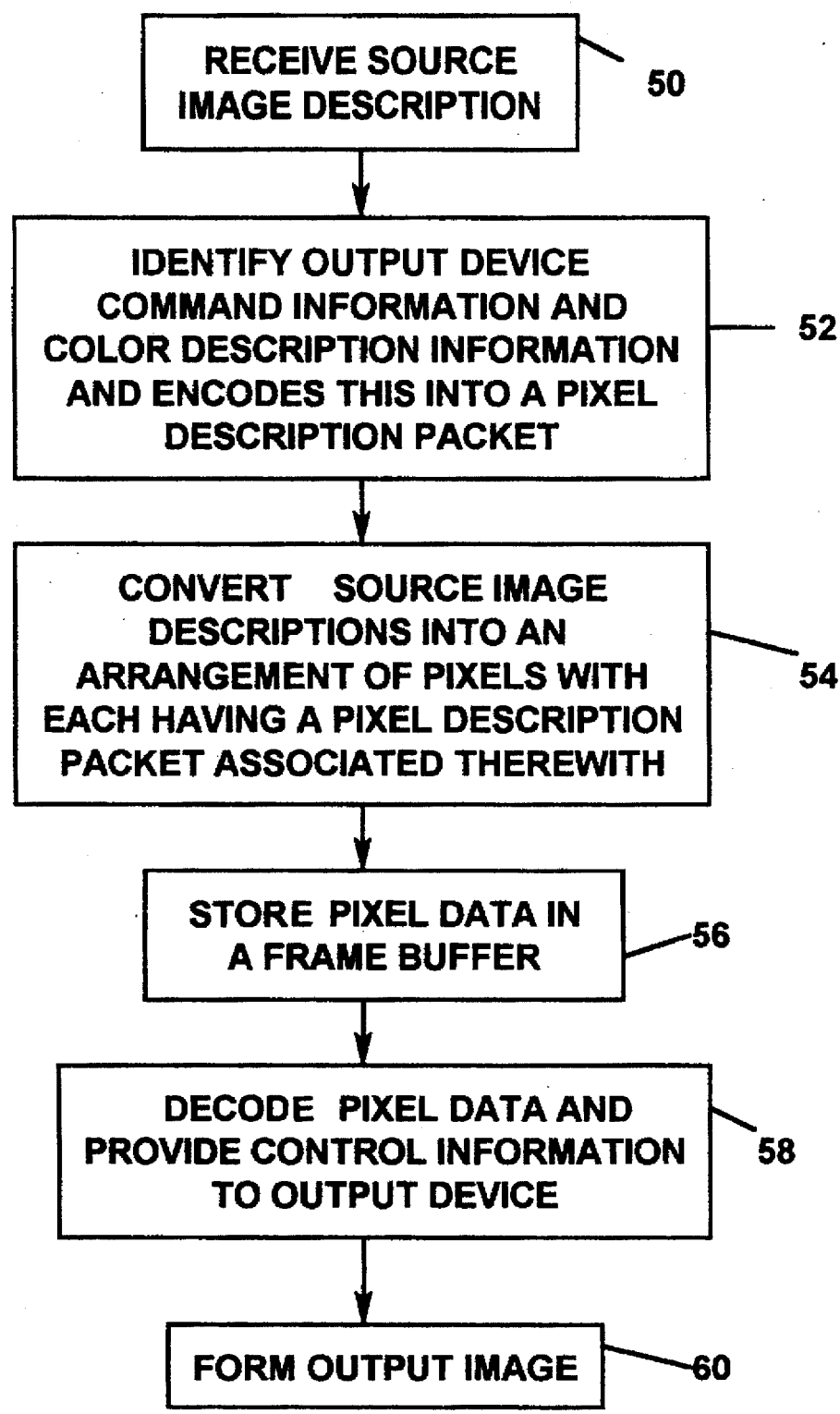
FIG. 2 is a flow chart describing the process flow in the system of FIG. 1.

The process of the present invention is illustrated in FIG. 2. The process begins by providing a source image description from image generator 12 to the raster image processor 40 as represented by step 50. The pixel description encoder 24 identifies output device command information and color description information and encodes this information into a pixel description packet as represented by step 52. The scan converter 26 converts the source image description into an arrangement of pixels with each pixel having a pixel description packet associated therewith as represented by step 54. Pixel locations as well as their associated pixel description packets are then stored in the frame buffer 28 as represented by step 56. This pixel data in the frame buffer 28 is then provided to an output device 14 whereupon the pixel data decode 22 decodes each pixel description packet and provides the corresponding control information to the print engine 32. Standard color information as well as custom color information is decoded from the pixel description packet for providing control information to the print engine 32 for producing colors specified in the pixel description packet. Hence, pixel data decoder 22 may identify custom color and special output device commands from the luminance value of the color coordinate values. Output device command information encoded into the pixel description packet is also decoded by the pixel data decode and the appropriate control signal is provided to the print engine 32 for providing the required control. The control signal is provided to the print engine 32 to form an output image as represented by step 60.

The method and apparatus of the present invention encodes both color and printer command information into a pixel description packet which is associated with each pixel location within the rasterized image. This color and command information is decoded from the pixel description packet to provide control to the output device print engine on a pixel-by-pixel basis. This technique of the present invention allows not only custom or non-standard colors to be specified but also various printer control commands to be specified on a pixel-by-pixel basis. Printer control commands may include any such conventional command which directs operation of the output device print engine 14 such as selection of printer resolution, anti-aliasing mode, single pass or multipass mode, unidirectional or bidirectional print modes to name a few. In this manner, the present invention more fully utilizes the output device capabilities.

In addition, in the preferred embodiment, the additional custom color information and output device command information is encoded into unused color coordinate values so that additional memory in the frame buffer is not required. Alternatively, however, the pixel description packet can include additional values for encoding output device commands.

In this preferred embodiment, standard color information is stored in the frame buffer in device independent format such as CIELAB color space. A console is then provided for viewing the contents of the frame buffer on a monitor for adjusting job control parameters.

Although the present invention has been described with reference to preferred embodiments, workers skilled in the art will recognize that changes may be made in form and detail without departing from the spirit and scope of the invention.

What is claimed is:

1. Apparatus for rendering an arrangement of pixel data representative of source images from source image page description language descriptions without requiring additional storage memory beyond that required for a two dimensional frame buffer sized to match the output resolution of an image output device, the apparatus comprising:

means for encoding an output device control information and color description information of a PDL source image into a two-dimensional image frame buffer comprising a plurality of discrete pixel description packets;

means for converting the plurality of pixel description packets into a plurality of adjacent pixel locations, wherein each of said plurality of pixel locations has a pixel description packet associated therewith; and means for decoding the pixel description packets for each pixel location to identify and electronically route the output device control information and color description information, respectively, to control the output device and accurately control color on a pixel-by-pixel basis to thereby form output pixels which accurately represent said PDL source image;

and wherein the output device control information is stored in an unused memory portion of the two dimesional frame buffer.

2. The apparatus for rendering an arrangement of pixel data of claim 1 wherein output device control information includes custom color specifications stored in an additional, second memory storage device, and wherein the unused portion of memory is dedicated to storing luminance values.

3. The apparatus rendering an arrangement of pixel data of claim 1 wherein the output device control information includes printer resolution control information for the output device.

4. The apparatus for rendering an arrangement of pixel data of claim 1 wherein color description information is specified by device independent color coordinate values in a CIELab color coordinate system.

5. The apparatus for rendering an arrangement of pixel data of claim 1 wherein the means for decoding the pixel description packet comprises a look up table containing pixel description packet values and corresponding printer control information for forming a specific level of resolution of discrete pixels.

6. A process for rendering an arrangement of pixel data representative of a source image from source image descriptions, the process comprising:

encoding control information for a digital output device and color description information in a source image PDL description into a plurality of pixel description packets sized to match a preselected controlled print resolution of the output device;

converting the source image PDL descriptions into an arrangement of adjacent pixel locations each having pixel description packets associated therewith;

storing each pixel description packet corresponding to each pixel location in a two-dimensional memory storage device; and sequentially decoding each pixel description packet to simultaneously control the output device and provide image color description information to the output device on a pixel-by-pixel basis;

wherein the control information for the digital output device is stored in an unused memory portion in the memory storage device.

7. The process for rendering an arrangement of pixel data of claim 6 wherein the control information for the digital output device includes a set of information for the digital output device that includes a select one of the following sets of printing mode information: a single pass print mode set, a multipass print mode set, a unidirectional print mode set, or a bidirectional print mode set.

8. A rendering system for rendering of a source image PDL descriptions as an arrangement of pixel packet data, the rendering system comprising:

converting means for rendering image description commands into a plurality of discrete adjacent pixel locations each having color values associated therewith specified in a device independent color system;

a two dimensional memory storage device for storing the color values associated with each said pixel location and for storing a control information set for a digital output device in an unused memory portion of the two dimensional memory storage device; and wherein both a video display monitor and the digital output device electrically connect to the memory storage device to display a high fidelity image which is accurately representative of the source image.

9. The rendering system of claim 8 further including connection means connected to the storage device for providing pixel location and pixel color information to an output device.

10. The rendering system of claim 9 wherein the output device is a plurality of output devices.

* * * * *